United States Patent [19]
Webster

[11] 4,184,365
[45] Jan. 22, 1980

[54] TIRE INSPECTION AND RECORDING DEVICE

[76] Inventor: David F. Webster, 1325A Edwards Ave., Santa Rosa, Calif. 95401

[21] Appl. No.: 971,803
[22] Filed: Dec. 21, 1978
[51] Int. Cl.² .................. B60C 19/10; G01M 17/02
[52] U.S. Cl. ............................ 73/146; 152/330 A
[58] Field of Search .............. 73/146; 116/34 R; 152/330 A, 187

[56] References Cited
U.S. PATENT DOCUMENTS 3,878,712  4/1975  Chapin .................................. 73/146
3,933,036  1/1976  Lippmann et al. .................... 73/146

*Primary Examiner*—Donald O. Woodiel
*Attorney, Agent, or Firm*—Eckhoff, Hoppe, Slick, Mitchell & Anderson

[57] ABSTRACT

An inspection and recording device for ascertaining surface abnormality on a pneumatic tire on a wheel on a dirigible vehicle and any deviation in the alignment of the wheel on which such tire is mounted with respect to the camber and toe-in of such wheel with respect to such vehicle and recording each such abnormality and each such misalignment.

2 Claims, 5 Drawing Figures

TIRE INSPECTION AND RECORDING DEVICE

BACKGROUND OF THE INVENTION

It has long been recognized that it is necessary that the wheels on a dirigible vehicle such as an automobile be in alignment for and aft the vehicle and particularly that the front wheels have the necessary camber and toe-in.

SUMMARY OF THE INVENTION

The device of the present invention can be readily utilized by merely having the vehicle pass over the test device in one direction so that each wheel completes one revolution to provide a record of the wheel track. The device particularly provides a convenient arrangement of a cover sheet, a transfer sheet for recording the pressure applied by the wheel and the area of such pressure application which is recorded on an adhesive surface, which surface, after completion of the test, is covered by a transparent protective sheet for inspection by the person conducting the test as well as the interested owner of the vehicle.

Generally various arrangements of such sheets have been used heretofore for other purposes but without the specific arrangement contemplated and taught by this invention. In this connection, reference is made to the patents to Digate U.S. Pat. No 2 998 983 and to Bertsch U.S. Pat. No. 3 223 437

It is in general the broad object of the present invention to provide an improved and simple form of test device for recording the path of travel of each of the wheels of a vehicle during horizontal traverse of the vehicle over a distance equal to that of one revolution of each of the wheels on the vehicle.

BRIEF DESCRIPTION OF THE DRAWINGS

FIG. 3 shows the record made of a wheel which is out of balance; FIG. 4 is a record made of a front wheel tire requiring from end alignment; and FIG. 5 is a fragmentary view illustrating in the central portion of the figure the presence of a blister on the tire tread.

DESCRIPTION OF THE PREFERRED EMBODIMENT

In the preferred embodiment, I provide a bottom sheet 6 having a central area thereof 7 coated with a suitable adhesive. The bottom sheet 6 is of a length sufficient to record the entire rotation of a wheel on a vehicle; usually the length is of the order of ten feet. The adhesive coated area is approximately 10 inches in width to provide an area of adequate width for recordation of the pressure application of the tread of a tire. The adhesive coated area is covered by a removable cover sheet 8 which is in place until just prior to the device being put to use when it is removed to expose the adhesive coated area. Superimposed over the adhesive coated area and the bottom sheet is a sheet of a transfer material 9 such as a carbon paper or a sheet having an ink transfer composition such as is disclosed in the Clark U.S. Pat. No. 2,944,037.

Figure 1:
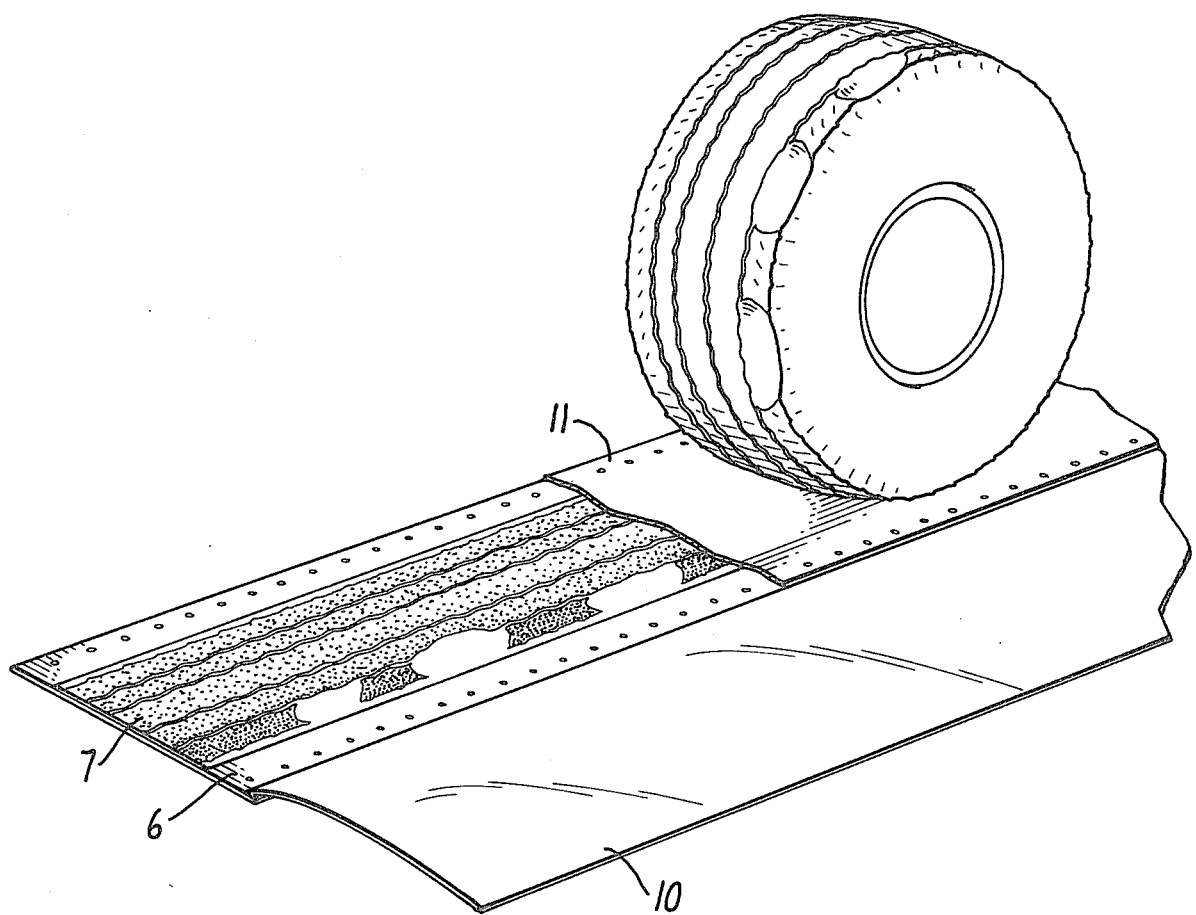
FIG. 1 is a plan view showing the device of this invention in use.
Figure 2:
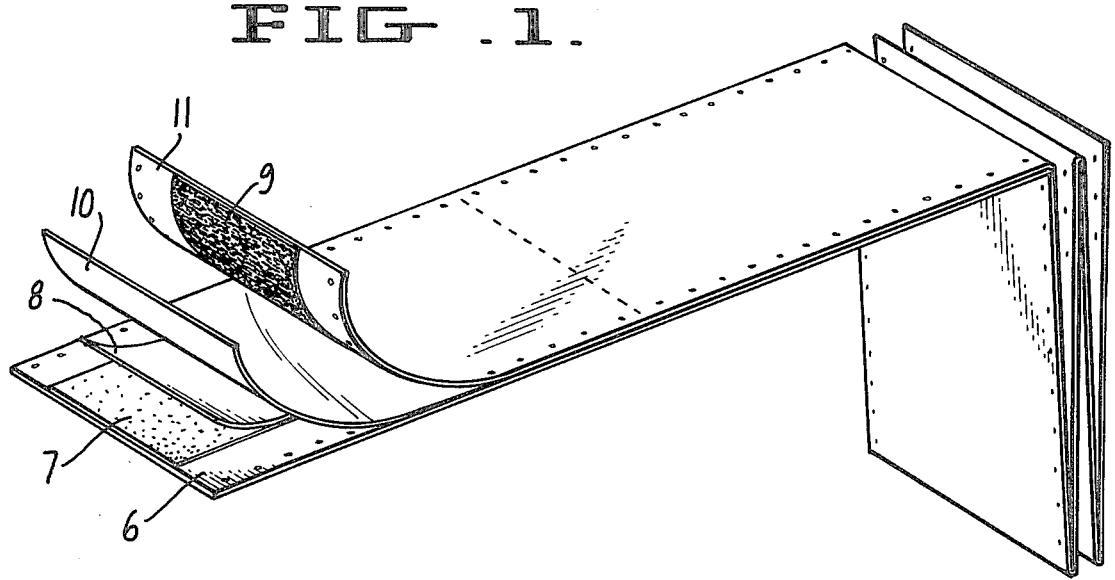
FIG. 2 is a fragmentary perspective view with portions of the assembled device broken away to illustrate the construction.

Interposed between the transfer material and the base sheet is a transparent cover sheet 10 which is hinged along one side of the bottom sheet 6 as is shown in the righthand portion of FIG. 1. Superimposed over the several elements 6, 7, 8, 9 and 10 is a cover sheet 11.

In use, the cover sheet is moved to one side of the bottom sheet 6 to expose the transparent cover sheet 10 so that the latter can be moved temporarily to one side of the bottom sheet 6. The cover sheet 8 over the adhesive coated area is then removed and discarded. The whole assembly is then reassembled with the transparent cover sheet laid to one side of the bottom sheet 6 as is shown in the righthand portion of FIG. 1. The whole assembly is then placed in position for traverse by one of the wheels of the vehicle. Following the traverse of such wheel, the cover sheet 11 and its attached transfer material are removed and the transparent cover sheet 10 is placed over the adhesive coated area which now contains a record of the traverse of the wheel.

Figure 3:
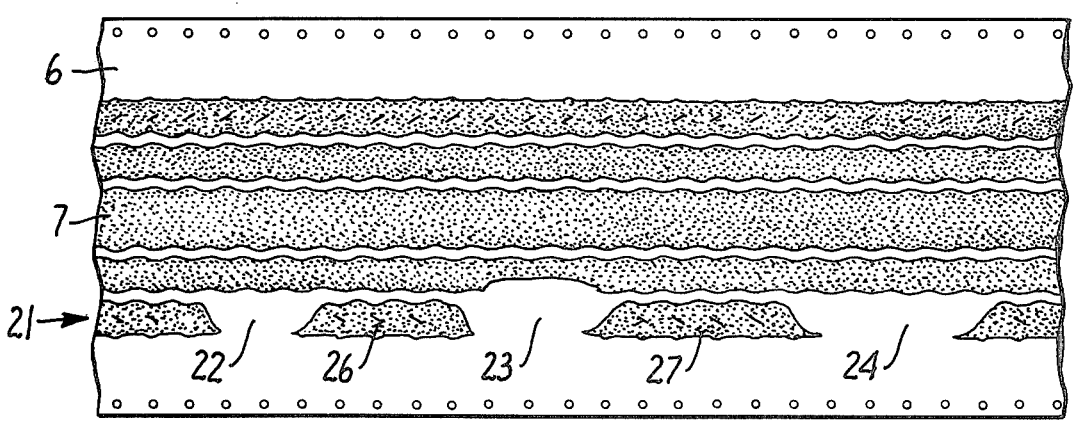
FIGS. 3, 4 and 5 are, respectively, typical tire impressions made under test conditions.

Thus, referring particularly to FIG. 3 in the drawing, the area marked 21 shows that the wheel is out of balance for the tire tread record is cupped in the areas indicated at 22, 23 and 24; comparison with the areas 26 and 27, reveals that the wheel is out of alignment for the pressure application is not the same in the two areas.

Figure 4:
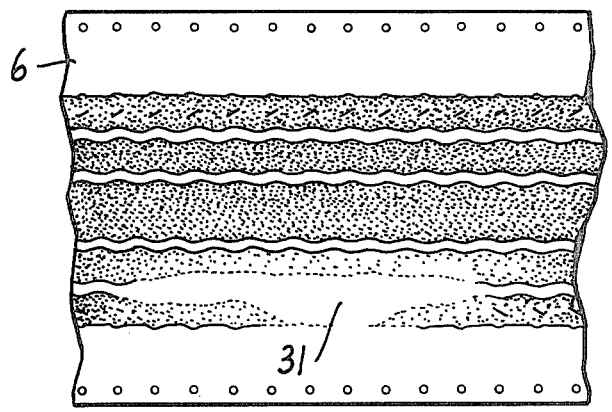
Figure 5:
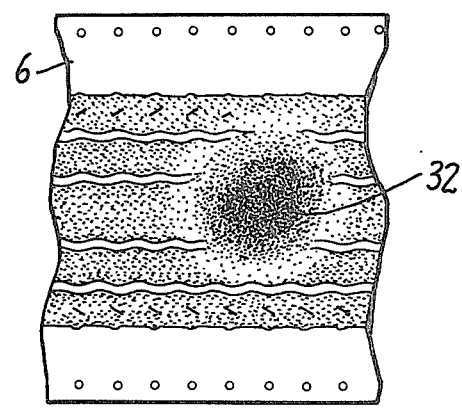

The upper and lower portions of FIG. 4 show that good pressure is applied in the upper portion while in the lower portion the wheel is not in contact and there is no pressure application in the lower area indicated at 31. This is indicative of the front end being out of alignment. In FIG. 5, the area indicated at 32 shows the record made when a blister is present on the tire.

I claim:

1. An inspection and recording device for ascertaining any surface abnormality on a pneumatic tire on a wheel on a dirigible vehicle and any deviation in the alignment of the wheel on which such tire is mounted with respect to the camber and toe-in of such wheel with respect to such vehicle and recording each such abnormality and each such misalignment comprising an upper sheet having a central area thereon defining a test area, marginal areas on either side of said test area, intermediate ink transfer means disposed beneath the test area on the upper sheet, a second sheet having an adhesive coated area thereon positioned below the upper sheet with the adhesive coated area only in the area of said second sheet located beneath said test area, the areas on said second sheet disposed beneath said upper sheet marginal areas being free of adhesive, said adhesive permanently receiving impressions imparted by any pressure applied in the test area on the upper sheet and transferred from the intermediate ink transfer surface, said areas on said second sheet which are free of adhesive not forming any impression of any portion of pressure applied to said upper sheet marginal areas so that only that portion of pressure application which is applied to said test area is recorded on said second sheet to form thereby a permanent record of pressure application during a pressure test, and a removable protective sheet over said adhesive coated area which is temporarily moved from between the upper sheet and the second sheet during application of any pressure to the test area and is thereafter returned as a protection for the information recorded on the adhesive coated area.

2. In a method of inspecting a pneumatic tire on a wheel on a dirigible vehicle to ascertain the presence of any abnormality on such tire and the presence of any deviation in the alignment of the wheel on which such tire is mounted with respect to the camber and toe-in of such wheel with respect to such vehicle, the steps of recording any abnormality and any misalignment by rotating the wheel having the pneumatic tire mounted thereon over the surface of an ink transfer sheet to form a surface image on an adhesive recording surface on a lower sheet, separating the wheel with its attached tire from such device, and examining the impression made and recorded on the adhesive surface.

* * * * *